(12) United States Patent
Katchmart (10) Patent No.: US 7,602,568 B1
(45) Date of Patent: *Oct. 13, 2009

(54) SYNCHRONOUS RRO WRITE

(75) Inventor: Supaket Katchmart, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/218,138

(22) Filed: Jul. 11, 2008

Related U.S. Application Data (63) Continuation of application No. 11/541,994, filed on Oct. 2, 2006, now Pat. No. 7,400,464.

(60) Provisional application No. 60/776,714, filed on Feb. 24, 2006.

(51) Int. Cl.
 *G11B 5/09* (2006.01)
 *G11B 5/596* (2006.01)

(52) U.S. Cl. .................. 360/51; 360/77.04; 360/77.02; 360/75

(58) Field of Classification Search ................ None
See application file for complete search history.

(56) References Cited

U.S. PATENT DOCUMENTS 6,775,091 B1 * 8/2004 Sutardja .................. 360/77.04
7,092,462 B2   8/2006 Annampedu et al.

OTHER PUBLICATIONS

"CORDIC"—From Wikipedia, the free encyclopedia; May 30, 2006—pp. 1-3.
"Discrete Fourier Transform"—From Wikipedia, the free encyclopedia; May 30, 2006—p. 1-12.

* cited by examiner

*Primary Examiner*—K. Wong (57) ABSTRACT

A hard disk drive system includes a control module that generates a phase offset signal for a repeatable run out (RRO) field of a servo wedge based on an RRO phase of the RRO field and a data phase of data in at least one other servo wedge field of a previously written wedge. A read/write channel module adjusts a clock phase based on the phase offset signal.

40 Claims, 11 Drawing Sheets

SYNCHRONOUS RRO WRITE

CROSS-REFERENCE TO RELATED APPLICATIONS

This application is a continuation of U.S. patent application Ser. No. 11/541,994, filed Oct. 2, 2006, which claims the benefit of U.S. Provisional Application No. 60/776,714 filed Feb. 24, 2006. The disclosures of the above applications are incorporated herein by reference in their entirety.

FIELD

The present disclosure relates to control systems, and more particularly to a control system with repeatable run-out compensation.

BACKGROUND

Figure 1:
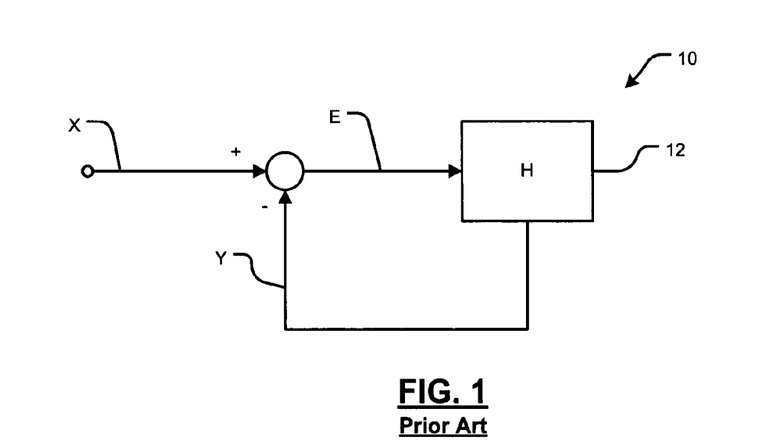
FIG. 1 is a functional block diagram of a control system according to the prior art.

Referring now to FIG. 1, an exemplary control system 10 includes an input signal X (i.e. a target response of the control system 10), an output response signal Y, and an error signal E. A control module 12 controls the output response signal Y based on the error signal E. The error signal E is a difference between the input signal X and the output response signal Y. In other words, the control module 12 attempts to control the output response signal Y to "follow" the input signal X. The control system 10 can be described as:

$Y=E*H$; and $E=X-Y$, where H represents a transfer function of the control system 10. Each of the values X, Y, and E is a vector that includes values that occur over time.

Figure 2:
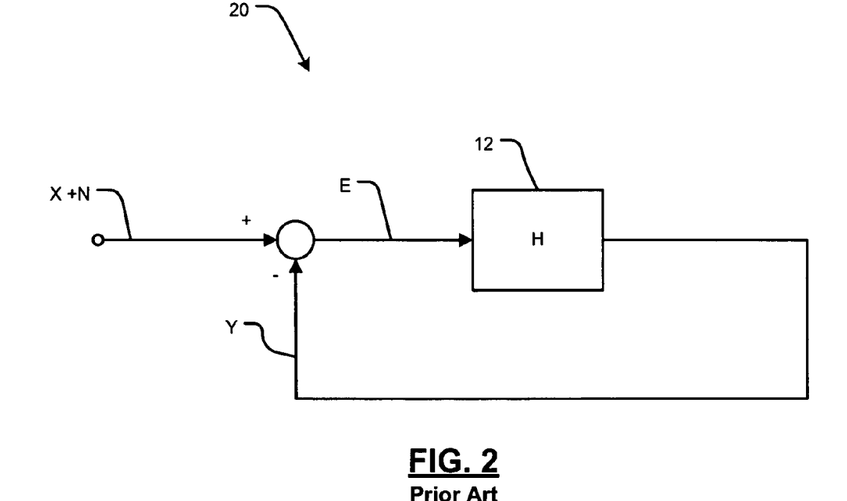
FIG. 2 is a functional block diagram of a control system that includes a noise component according to the prior art.

Referring now to FIG. 2, a control system 20 typically receives a disturbance N (e.g. noise). For example, the disturbance N may be introduced into the control system 20 due to performance, manufacturing, and/or environment imperfections. The disturbance signal N is added to the input signal X to model the effects of the disturbance N on the control system 20. The result is a final observable response signal Y. The control system 20 can be described as:

$Y=E*H$ and $E=(X+N)-Y$.

The disturbance signal N may include a random component (e.g. random noise) and/or a repeatable component (e.g. a recurring disturbance due to a constant system imperfection). A repeatable component in the disturbance signal N is referred to as "repeatable run-out" (RRO). For example, a hard disk drive (HDD) is a magnetic data storage medium that includes a rotating disk. A read/write head reads data from the disk and/or writes data to the disk as the disk rotates. When the disk rotates at high speeds, imperfections in the HDD and/or the disk may cause errors in position detection and control of the read/write heads.

Figure 3:
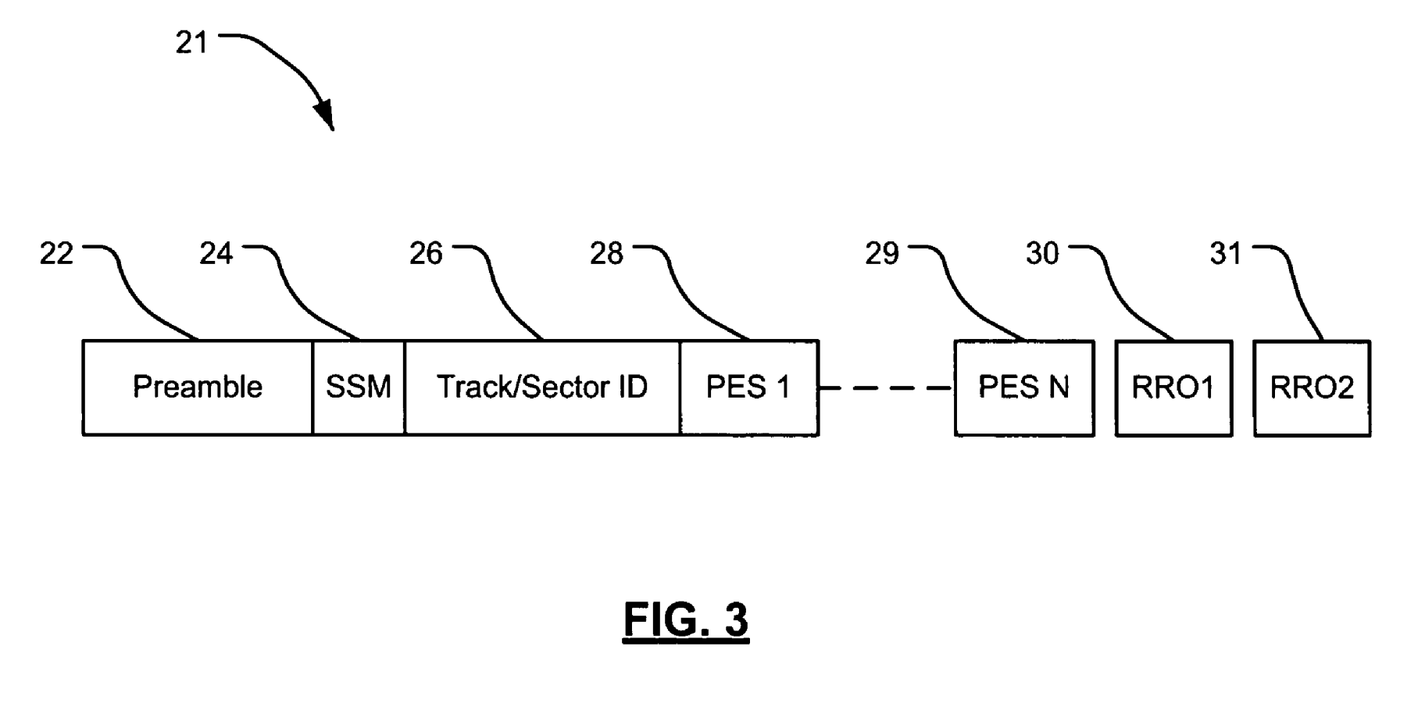
FIG. 3 is a diagrammatic view of a servo wedge.

Referring now to FIG. 3, in a HDD, positioning a read/write head over a disk medium is accomplished by having a servo loop lock to a predetermined servo wedge. A servo wedge 21 is a data string that contains several data fields, including a preamble field 22, a servo sync-mark (SSM) 24 field, a track/sector identification (ID) field 26, and a plurality of position error signal (PES) fields 28, 29. A burst gate pulse indicates the beginning of a servo wedge or a portion of a servo wedge.

An acquisition preamble is typically recorded in the preamble field 22. This enables a read channel within the HDD to acquire the appropriate timing and amplitude information from the read signal before reading the servo information. The preamble field 22 is also used to lock a servo timing loop clock phase and frequency to a servo wedge and synchronize the servo information stored in the servo track/sector ID field 26.

SSM 24 is used to mark the ending point of the preamble field 22 and the starting point of the track/sector ID 26 and used as a reference point for the position of other data payloads throughout servo fields.

The track/sector ID field 26 indicates both the circumferential position and the coarse radial position of a head. The track/sector ID field 26 typically includes a servo track number, which identifies the current track the head is over while the head is seeking to a selected track. The track/sector ID field 26 also includes sector identification data used to identify the data sectors of the tracks.

HDDs typically encode the track number using what is known as a Gray code. A Gray code provides a sequence of binary numbers in which only one digit changes state from one code value to the next. A Gray code for track number identification is implemented with each code bit requiring two flux transitions. Using two flux transitions, such as dibits, to encode a bit preserves the magnetization sequence of the signals from the respective binary digits between tracks.

A dibit is a pair of sequential bits, the first bit being of a first polarity, the subsequent bit being of an opposite polarity. For example, if the first bit is negative, the dibit has a positive bit immediately following. Alternatively, if the first bit is positive, the dibit has a negative bit immediately following. DiBit is one encoding method used to encode user data bits stored in the track/sector ID field 26 for subsequent decoding of the data it represents.

The position information contained in a servo field is used to determine the fine position of the head on the disk surface and to provide the HDD control module an instantaneous position error signal (PES). The PES 28, 29 provide information concerning fine radial positioning of the head. Typically, a PES is the difference between the measured position computed from the servo pattern and the desired position of the head. A fine position of the head on the disk surface may be generated by the servo system by comparing the relative signal strengths of various PES fields on the disc surface.

Conventionally, the RRO information is stored on the disk itself. One efficient storage method is to embed the RRO values 30, 31 within the servo wedge 21. Normally, preamble, SSM, track/sector ID, and PES fields are written at the same time. Hence, the phases of these fields are generally coherent. However, an RRO field is written at a different time due to various requirements of calibration techniques used in HDD manufacturing processes. Unavoidable circuit latency and the physical structure of disk drive read/write head causes written RRO fields to have a certain amount of phase offset as compared to servo preamble, SSM, and PES fields. Degradation in RRO detection may therefore occur because many data detectors are sensitive to phase offset. An RRO field may include three sub-fields in following sequence: RRO preamble, RRO sync mark, and RRO data. RRO phase may be the position of the RRO field as it deviates from an ideal position (i.e. a position without phase offset compared to the other wedge fields).

Further, asynchronous RRO writes often require redundant preambles and sync marks in response to incoming servo waveforms becoming asynchronous. This is generally because new preamble and sync marks are used to match-up timing information from asynchronous waveforms and to detect actual position of waveform data.

SUMMARY

A hard disk drive system includes a control module that generates a phase offset signal for a repeatable run out (RRO) field of a servo wedge based on an RRO phase of the RRO field and a data phase of data in at least one other servo wedge field of a previously written wedge. A read/write channel module adjusts a clock phase based on the phase offset signal.

In other features, the read/write channel module includes a clock that clocks servo data. The read/write channel module further includes a phase adjust module that generates a phase adjust signal based on the phase offset signal. The clock generates a clock phase adjust signal to adjust the clock phase based on the phase adjust signal. The phase adjust signal incrementally adds or subtracts phase offset adjustment to the clock to increase or decrease a clock waveform until a total phase offset of the phase offset signal is reached.

In other features, the at least one other servo wedge field includes at least one of a preamble, a servo sync mark, a track/sector ID, and a position error signal. The at least one other servo wedge field includes a preamble, wherein the control module generates the phase offset signal by writing a previously written wedge, locking a clock phase to the previously written wedge, and detecting phase and data of the preamble in the previously written wedge.

In other features, the control module generates the phase offset signal by generating a calibration field which may include RRO preamble, RRO sync mark, and RRO data. The control module may also generate the phase offset signal based on the calibration field and the previously written wedge and/or a field within the previously written wedge. The control module generates the phase offset signal based on total phase offset between the calibration field and the previously written wedge and/or the field within the previously written wedge. The control module also checks RRO field position for offset with the preamble.

The control module generates waveform data from a Discrete Fourier Transform of the previously written wedge and the calibration field and uses the waveform data to generate the total phase offset. The control module generates angle information from the waveform data using Coordinate Rotational Digital Computer (CORDIC). The control module generates angle information from the waveform data, a demodulation cycle latency and a demodulation phase latency, and a count cycle based on the demodulation cycle and phase latency. The control module aligns a dibit in the servo wedge by stretching the RRO phase to match a sync field phase when the dibit is offset.

The control module further generates an expected waveform of the RRO field and generates a detected RRO phase and RRO data from a detected waveform of an actual RRO field, and wherein the control module generates the phase offset signal from a phase difference between the expected waveform and the detected waveform. The control module determines the total phase offset from at least one of a dibit latency, a cycle latency, and a clock phase latency. The control module generates a calibration field in the previously written wedge including an RRO sync mark having a position shifted by the RRO phase, wherein the at least one other servo wedge field includes a preamble of the previously written wedge. The control module computes a difference between a phase of the preamble in the previously written wedge and a phase of the calibration field by analyzing common preamble data and generates the phase offset signal from the difference.

In other features, a detector detects the calibration field and the previously written wedge and measures an angle and an amplitude of waveforms within the calibration field and the previously written wedge.

In other features, a hard disk drive system includes control means for generating a phase offset signal for a repeatable run out (RRO) field of a servo wedge based on an RRO phase of calibration field and a data phase of data in at least one other servo wedge field of a previously written wedge. The hard disk drive system also includes read/write channel means for adjusting a clock phase based on the phase offset signal. The read/write channel means further includes clock means for clocking servo data. The read/write channel means further includes phase adjust means for generating a phase adjust signal based on the phase offset signal.

In other features, the clock means generates a clock phase adjust signal to adjust the clock phase based on the phase adjust signal. The phase adjust signal incrementally adds or subtracts phase offset adjustment to the clock means to increase or decrease a clock waveform until a total phase offset of the phase offset signal is reached. The at least one other servo wedge field includes at least one of a preamble, a servo sync mark, a track/sector ID, and a position error signal.

In other features, the at least one other servo wedge field includes a preamble, wherein the control means generates the phase offset signal by writing a previously written wedge, locking the clock phase to the previously written wedge, and detecting phase and data of the preamble in the previously written wedge. The control means generates the phase offset signal by generating a calibration field including the RRO field waveform with phase offset equal to an RRO phase in the preamble. The control means generates the phase offset signal based on the calibration field and the previously written wedge.

In other features, the hard disk drive system includes detector means for detecting the calibration field and the previously written wedge and that measures an angle and an amplitude of waveforms within the calibration field and the previously written wedge. The control means generates the phase offset signal based on total phase offset between the calibration field and the previously written wedge. The RRO field is checked by the control means for offset with the preamble.

The control means generates waveform data from a Discrete Fourier Transform of the previously written wedge and the calibration field and uses the waveform data to generate the total phase offset. The control means generates angle information from the waveform data using Coordinate Rotational Digital Computer (CORDIC). The control means generates angle information from the waveform data, a demodulation cycle latency and a demodulation phase latency, and a count cycle based on the demodulation cycle and phase latency.

The control means aligns a dibit in the servo wedge by stretching the RRO phase to match a sync field phase when the dibit is offset. The control means generates an expected waveform of the RRO field and generates a detected RRO phase and RRO data from a detected waveform of an actual RRO field, and wherein the control means generates the phase offset signal from a phase difference between the expected waveform and the detected waveform. The control means also determines the total phase offset from at least one of a dibit latency, a cycle latency, and a clock phase latency. The control means generates a calibration field including an RRO sync mark within the RRO field shifted by an RRO phase, wherein the at least one other servo wedge field includes a preamble of the previously written wedge. The control means also computes a difference between a phase of the preamble in the previously written wedge and a phase of the calibration field by analyzing common preamble data and generates the phase offset signal from the difference.

In still other features, the systems and/or methods described above are implemented by a computer program executed by one or more processors. The computer program can reside on a computer readable medium such as but not limited to memory, non-volatile data storage and/or other suitable tangible storage mediums.

In other features, a computer program stored for use by a processor for operating a computer program for operating a hard disk drive, includes generating a phase offset signal for a repeatable run out (RRO) field of a servo wedge based on an RRO phase of the RRO field and a data phase of data in at least one other servo wedge field of a previously written wedge. The computer program also includes adjusting a clock phase based on the phase offset signal.

The computer program for operating the hard disk drive further includes clocking servo data in a read/write channel module and generating a phase adjust signal based on the phase offset signal. The computer program generates a clock phase adjust signal for adjusting the clock phase based on the phase adjust signal. The phase adjust signal incrementally adding phase offset adjustment to the clock phase for increasing or decreasing a clock waveform until a total phase offset of the phase offset signal is reached. The at least one other servo wedge field includes at least one of a preamble, a servo sync mark, a track/sector ID, and a position error signal. The at least one other servo wedge field includes a preamble, and further including generating the phase offset signal by writing a previously written wedge, locking a clock phase to the previously written wedge, and detecting phase and data of the preamble in the previously written wedge.

In other features, the computer program for operating the hard disk drive generates the phase offset signal by generating a calibration field including the RRO field waveform with phase offset equal to an RRO phase in the preamble. The computer program generates the phase offset signal based on the calibration field and the previously written wedge. The computer program detects the calibration field and the previously written wedge and measures an angle and an amplitude of waveforms within the calibration field and the previously written wedge. The computer program for operating the hard disk drive further includes generating the phase offset signal based on total phase offset between the calibration field and the previously written wedge. The computer program checks the RRO field offset with the preamble and generates waveform data from a Discrete Fourier Transform of the previously written wedge and the calibration field and using the waveform data for generating the total phase offset.

The computer program further includes generating angle information from the waveform data using Coordinate Rotational Digital Computer (CORDIC). The computer program generates angle information from the waveform data, a demodulation cycle latency and a demodulation phase latency, and a count cycle based on the demodulation cycle and phase latency.

In other features, the computer program aligns a dibit in the servo wedge by stretching the RRO phase to match a sync field phase when the dibit is offset and generates an expected waveform for the at least one other servo wedge field and generating a detected waveform from the RRO phase and the data, and further including generating the phase offset signal from a phase difference between the expected waveform and the detected waveform. The computer program further includes determining, the total phase offset from at least one of a dibit latency, a cycle latency, and a clock phase latency.

The computer program also generates a calibration field. The computer program then computes a difference between a phase of the preamble in the previously written wedge and a phase of the calibration field by analyzing common preamble data and generating the phase offset signal from the difference.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure describes systems and methods for writing an RRO pattern at a phase synchronous to a servo preamble phase. This may include using a phase adjustment to an RRO write process that compensates for analog read channel and write channel latencies. The RRO synchronization systems and methods are applicable to control of any system that operates in a repetitive manner.

Figure 4:
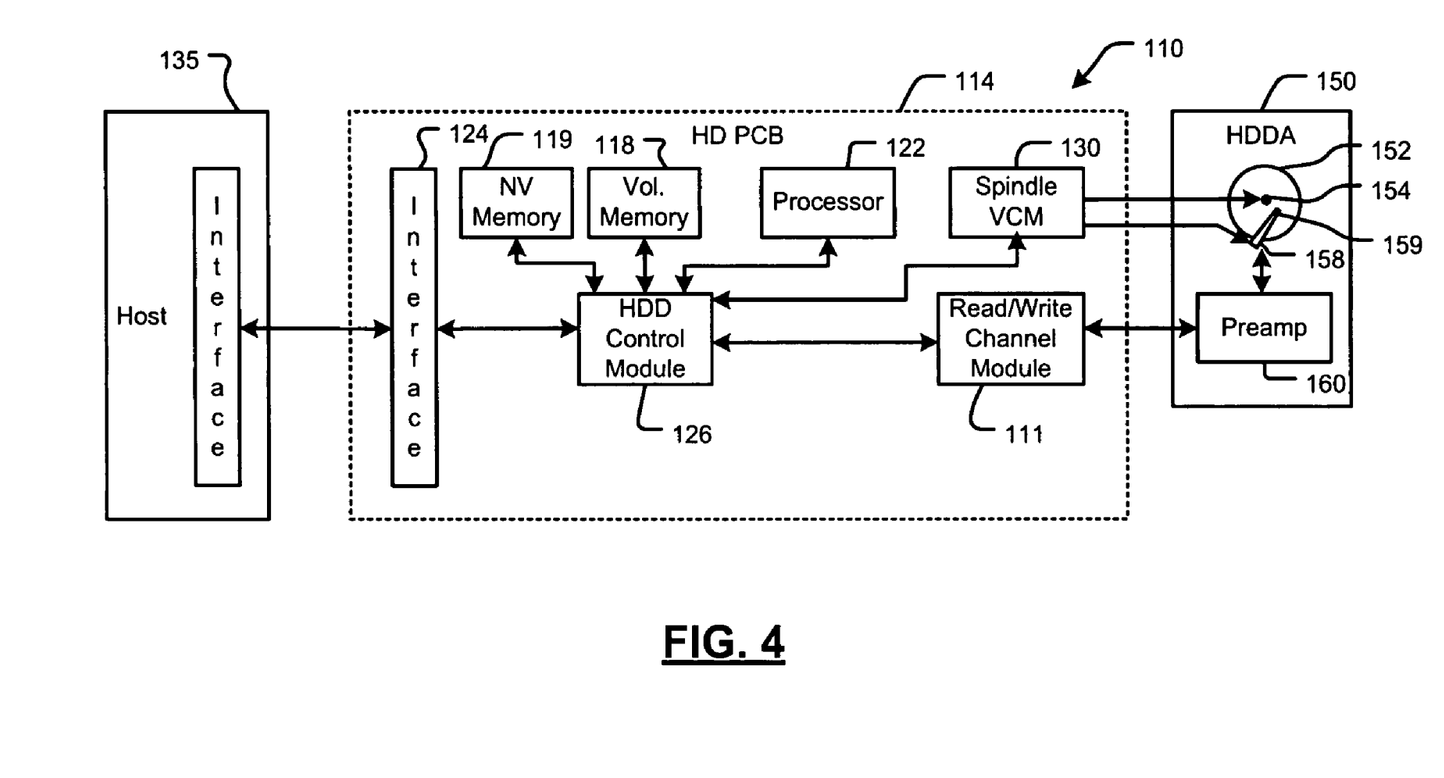
FIG. 4 is a functional block diagram of a hard disk drive (HDD) that synchronizes repeatable run-out (RRO) with servo wedge fields according to the present disclosure.

Referring now to FIG. 4, an exemplary HDD system 110 (control system) is shown that implements an RRO phase adjust in a read/write channel module 111. The system 110 is shown to include a HDD printed circuit board (PCB) 114. A buffer 118 stores read, write and/or volatile control data that is associated with the control of the HDD system 110. The buffer 118 usually employs volatile memory having low latency. For example, SDRAM or other types of low latency memory may be used. Nonvolatile memory 119 such as flash memory may also be provided to store critical data such as nonvolatile control code.

A processor 122 arranged on the HDD PCB 114 performs data and/or control processing that is related to the operation of the HDD system 110. A hard disk control (HDC) module 126 communicates with an input/output interface 124 and with a spindle/voice coil motor (VCM) driver or module 130 and/or a read/write channel module 111. The HDC module 126 coordinates control of the spindle/VCM driver 130, the read/write channel module 111 and the processor 122 and data input/output with a host 135 via the interface 124.

During write operations, the read/write channel module 111 encodes the data to be written onto a read/write device 159. The read/write channel module 111 processes the write signal for reliability and may apply, for example, error correction coding (ECC), run length limited coding (RLL), and the like. During read operations, the read/write channel module 111 converts an analog read signal output of the read/write device 159 to a digital read signal. The converted signal is then detected and decoded by known techniques to recover the data that was written on the HDD.

A hard disk drive assembly (HDDA) 150 includes one or more hard drive platters 152 that include magnetic coatings that store magnetic fields. The platters 152 are rotated by a spindle motor that is schematically shown at 154. Generally the spindle motor 154 rotates the hard drive platters 152 at a controlled speed during the read/write operations. One or more read/write arms 158 move relative to the platters 152 to read and/or write data to/from the hard drive platters 152. The spindle/VCM module 130 controls the spindle motor 154, which rotates the platter 152. The spindle/VCM driver 130 also generates control signals that position the read/write arm 158, using a voice coil actuator, a stepper motor, or any other suitable actuator.

The read/write device 159 is located near a distal end of the read/write arm 158. The read/write device 159 includes a write element such as an inductor that generates a magnetic field. The read/write device 159 also includes a read element (such as a magneto-resistive (MR) element) that senses the magnetic field on the platters 152. The HDDA 150 includes a preamp circuit 160 that amplifies the analog read/write signals. When reading data, the preamp circuit 160 amplifies low level signals from the read element and outputs the amplified signal to the read/write channel module 111. While writing data, a write current is generated that flows through the write element of the read/write device 159. The write current is switched to produce a magnetic field having a positive or negative polarity. The positive or negative polarity is stored by the hard drive platters 152 and is used to represent data.

Portions of the HDD system 110 may be implemented by one or more integrated circuits (IC) or chips. Alternatively, most of the HDD system 110 other than the HDDA 150 may be implemented as a system on chip (SOC). Further, various portions of the HDD system 110 including the HDC module 126, the processor 122, and the read/write channel module 111 may be considered a control module for purposes of the present disclosure.

The spindle/VCM module 130 also controls the position of read/write elements on the read/write arms 158 via a servo. More specifically, the spindle/VCM module 130 controls a head suspension assembly to position a read/write element as close as possible to a specified track location on the platters 152. During normal drive operation, it is desirable to follow the RRO signal. Conversely, during self-servo writing, it is not desirable to follow the RRO of the servo signal.

Figure 5:
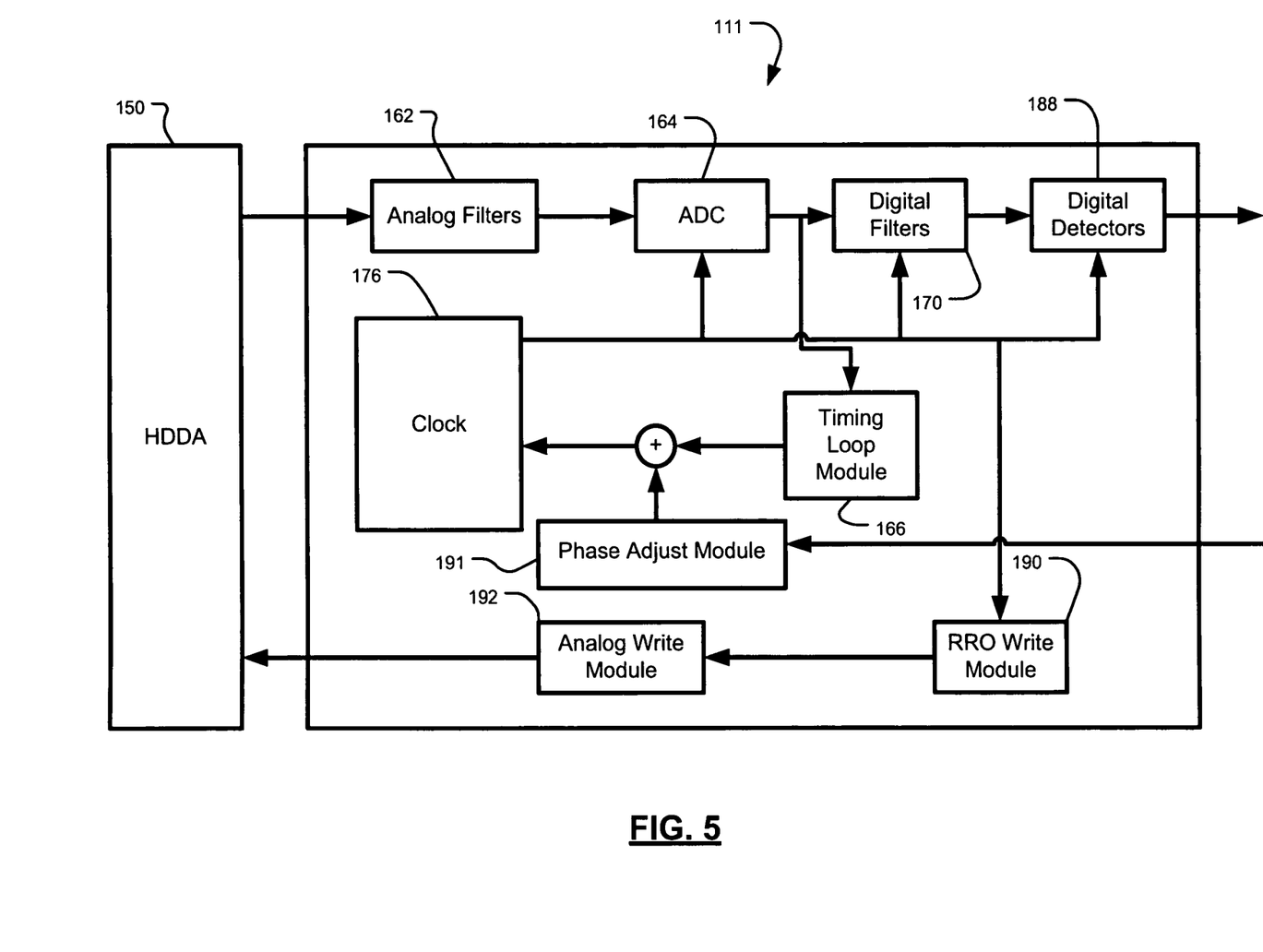
FIG. 5 is a functional block diagram of a read write channel module according to the present disclosure.

Referring now to FIG. 5, a detailed view of the read/write channel module 111 is illustrated. The read/write channel module 111 reads data from and writes data to the HDDA 150. The read/write channel module 111 includes analog filters 162, an analog-to-digital converter 164 (ADC), a timing loop module 166, digital filters 170, a clock 176, digital detectors 188, an RRO write module 190, a phase adjust module 191, and an analog write module 192.

Analog read data from the HDDA 150 is filtered by analog filters 162 and then received by the ADC 164. The ADC 164 samples the data of the signal according to a predetermined sampling rate of the clock 176. The output of the ADC 164 is used as feedback to control the timing of digital phase processing through the timing loop module 166.

The clock 176 locks the fields (preamble, SSM, PES) of the read data to a clock waveform in response to timing loop module 166 signals. Due to latencies in the system, during write operations, RRO is offset from the other fields of the servo wedge. RRO data may be offset corrected by adjusting the clock 176 with a signal from the phase adjust module 191.

The data from the ADC 164 and clock 176 is then filtered by digital filters 170 and received by digital detectors 188. The digital detectors 188 process this sampled data into data bit sequence of ones and zeros.

For an RRO writing process, the HDC module 126 processes signals from the read/write channel module 111. It then writes a calibration field based on a previously written wedge or wedge field having the same phase as an extended RRO preamble. The read channel analyzes this extended RRO preamble and generates amplitude and angle information. The HDC module 126 calculates phase adjustment values based on amplitude and angle data of the calibration field with that of the original wedge and programs this adjustment value to the phase adjust module 191. The phase adjust module 191 generates a phase adjust (synchronization) signal that is received by the clock 176. The RRO write module 190 and the analog write module 192 write a phase adjusted RRO on the servo wedge based on phase adjusted clock signals.

Figure 6:
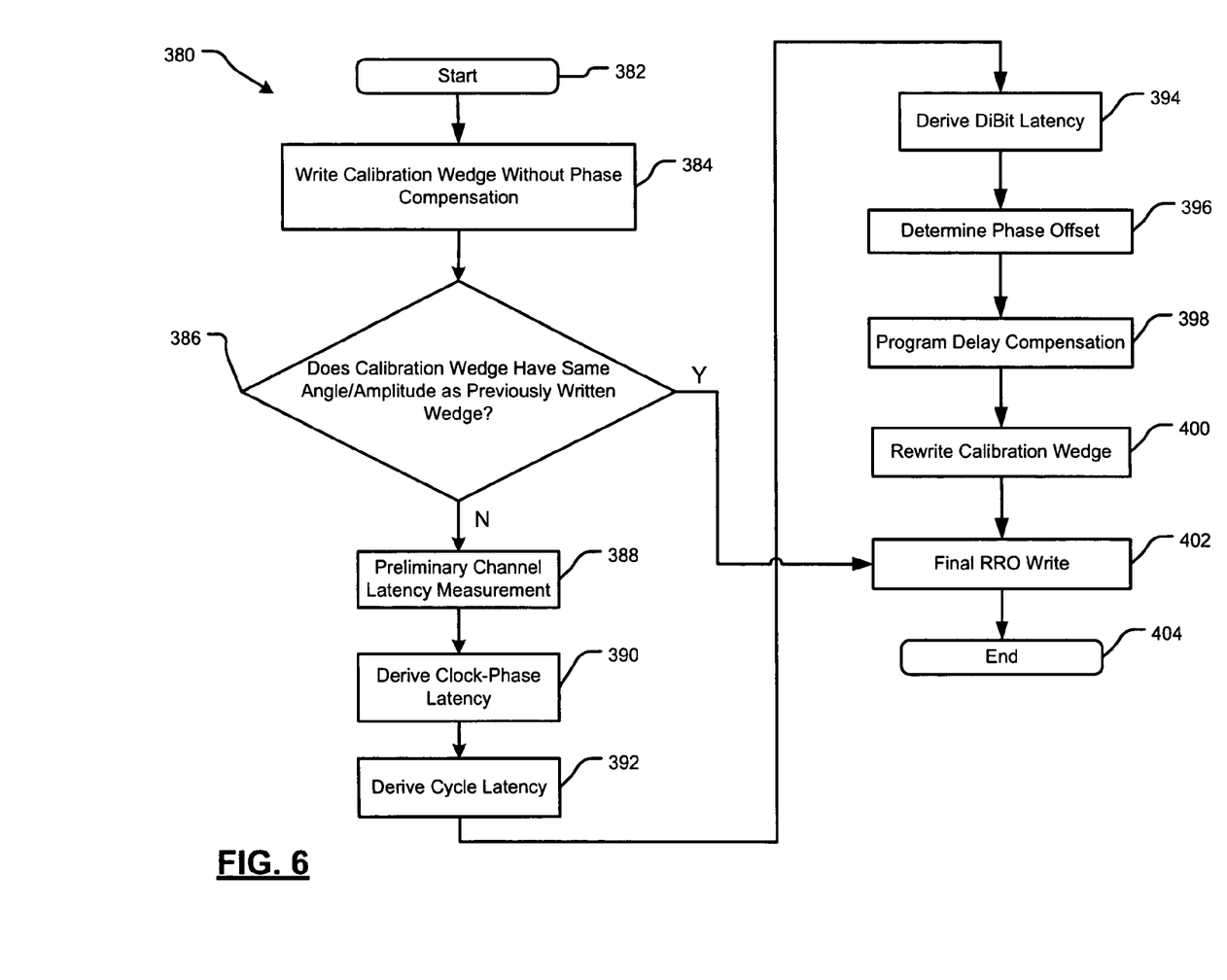
FIG. 6 is a flow diagram that illustrates steps of an RRO synchronization method according to the present disclosure.

Referring now to FIG. 6, a method 380 for writing RRO synchronously with other portions of a servo wedge begins in step 382. In step 384, a calibration field is written without any phase compensation. In step 386, a determination is made as to whether the calibration field has the same angle and amplitude as the previously written (original) wedge. For a positive response, step 402 is activated.

Otherwise, in step 388, preliminary channel latency is measured, which includes measuring the amplitude and angle of the calibration field as compared to the originally written wedge. The following steps are used to measure channel latency. A first RRO is written without any phase compensation. This compensated RRO wedge has an extended RRO preamble. The length of the RRO preamble is at least the length of the PES plus four dibits. In step 390, clock phase latency is derived. In step 392, cycle latency is derived. In step 394, dibit latency is derived.

Figure 7:
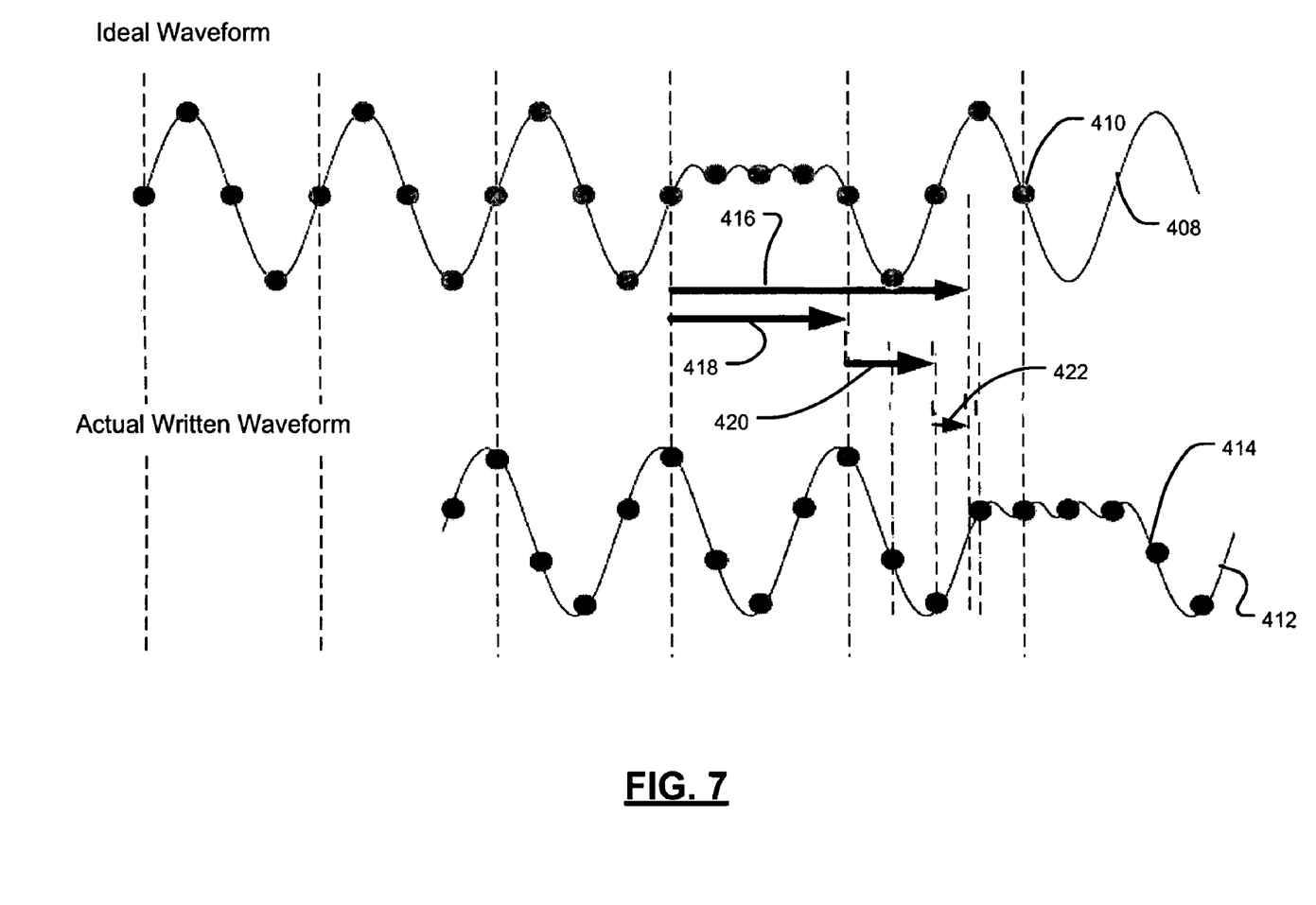
FIG. 7 is a diagram of an ideal waveform and a written waveform.

Referring now to FIG. 7 in view of steps 390, 392, and 394 in FIG. 6, sample locations in the RRO field are predetermined by phase and frequency of the preamble field. FIG. 7 shows a 2T pattern with an ideal RRO field waveform 408 that is written synchronized to the preamble field. The ideal RRO field waveform includes ADC sample locations 410 and may be the previously written wedge discussed above. FIG. 7 also shows the waveform 412 having a phase offset and its ADC sample locations 414.

A total phase offset or latency 416 is decomposed into three offset components—dibit latency 418, cycle latency 420, and clock phase latency 422. To accurately detect phase difference, these latency components are individually measured and later combined. Total phase latency 416 may also be determined by the sum of time required for read/write channel module 111 and HDDA read and write operations.

A Discrete Fourier Transform (DFT) of the fundamental frequency of the calibration field can be performed. Angle offset of the calibration field is computed from sine and cosine terms from the DFT through such methods as CORDIC (Coordinate Rotational Digital Computer). Since the timing loop is previously locked to the preamble field, this resulting angle information indicates how much phase offset the calibration field has compared to the previously written preamble field. This angle information may be representative of cycle and clock phase latency.

An equation for dibit latency is based on phase offset measured after clock phase latency and cycle latency correction and includes the following. Expected distance equals the sum of Gray code field length, the gap between the Gray code field and the PES, the length of the PES field, the PES gap, the gap between the PES and the RRO field, the RRO field length, and the inherent circuit delay. Dibit latency will be discussed further below regarding "on the fly" latency detection.

In step 396, phase offset is determined in the HDC module 126 through combining cycle latency, clock-phase latency, and dibit latency. In step 398, delay compensation is programmed for the RRO write operation. At this point, total latency may be used to select a clock phase of the RRO write module 190 to compensate for phase offset.

In step 400, the calibration field is rewritten and compared to the phase of preamble field to check for remaining phase offset. During this iteration, the calibration field should have the same phase as the preamble field aka phase offset is less than an uncertainty threshold. In step 402, as a function of zero phase offset, the final RRO write is performed. Logic ends in step 404.

Figure 8A:
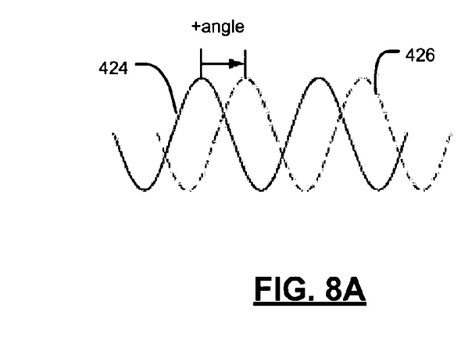
FIG. 8A is a diagram of a waveform offset by an angle.
Figure 8B:
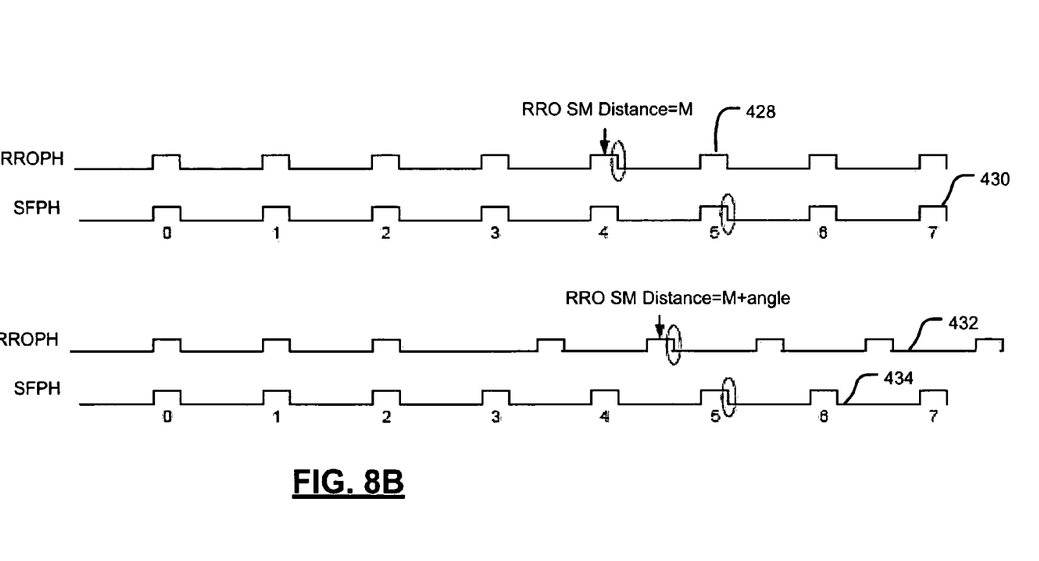
FIG. 8B is a diagram of numbered pulses for RRO offsets.

Referring now to FIGS. 8A and 8B, a method for on the fly dibit latency detection and phase correction is illustrated. As mentioned earlier, dibit latency can be accurately measured after performing a correction for sample and phase latency. However, compensation for dibit latency may be sufficient to compensate for RRO phase offset when sufficient information is known about sample and phase latency of an incoming servo wedge.

Demodulation cycle latency and demodulation phase latency are derived from the measured phase offset angle. A first signal wave 424 is at a default angle (Angle) equal to zero, and the second signal wave 426 is offset at an Angle equal to "+angle". Count cycle latency and count sample latency are measured latencies from a reference location to the point where the RRO sync mark is found. They are determined by counting each clock cycle and are rounded to the nearest clock edge.

When total delay falls close to the cycle boundary, count cycle latency is zero or a boundary. When count cycle latency equals zero, demodulation cycle latency and demodulation phase offset are analyzed. When both numbers show an offset close to the boundary, count cycle latency is subtracted by one. When count cycle latency equals the boundary, and when cycle and phase latency numbers are close to 0, then cycle latency is increased by one.

Assuming a twelve bit demodulated angle is [11:0], then a demodulation phase equals [11:9] or the demodulated angle of the ninth numbered bit. A zero phase start (ZPS) routine in the HDC module 126 is implemented. A zero phase start RRO phase (RROPH) 428 and sync field phase (SFPH) 430 are illustrated. In other words, for ZPS, RRO phase is assumed to be synchronous, and RROSM distance equals M. The dibit signal is aligned with the incoming data by stretching out RRO phase 432 to match the sync field phase 434 as close as possible when the dibit data is offset. Therefore, RROSM distance equals M plus "+angle", where M is a fraction of the dibit. RROSM asynchronous distance equals demodulated dibit (DDibit) added to demodulated angle divided by the maximum angle.

Three cases are now described for various zero phase start phase values. First, when ZPS PH equals 1,2,3,4,5,6, then demodulated dibit equals the count number of the Angle, and that is set to the demodulated Angle.

Second, when ZPS PH equals zero, a boundary condition is reached, a determination is made as to whether the demodulated angle equals zero, one, or seven. When it equals zero or one, the DDibit equals the count number, and that is set to the demodulated angle. When it equals seven, then it is too high, and DDibit equals the count number minus one, and that is set equal to the demodulated angle.

Third, when ZPS PH equals seven, the clock is generally aligned; and a determination is made as to whether demodulated angle equals six or seven or zero. When the demodulated angle equals six or seven, DDibit equals count number minus one, and that is set equal to the demodulated angle. When the demodulated angle equals zero, DDibit equals the count number Angle, and that is set to the demodulated angle.

Figure 9:
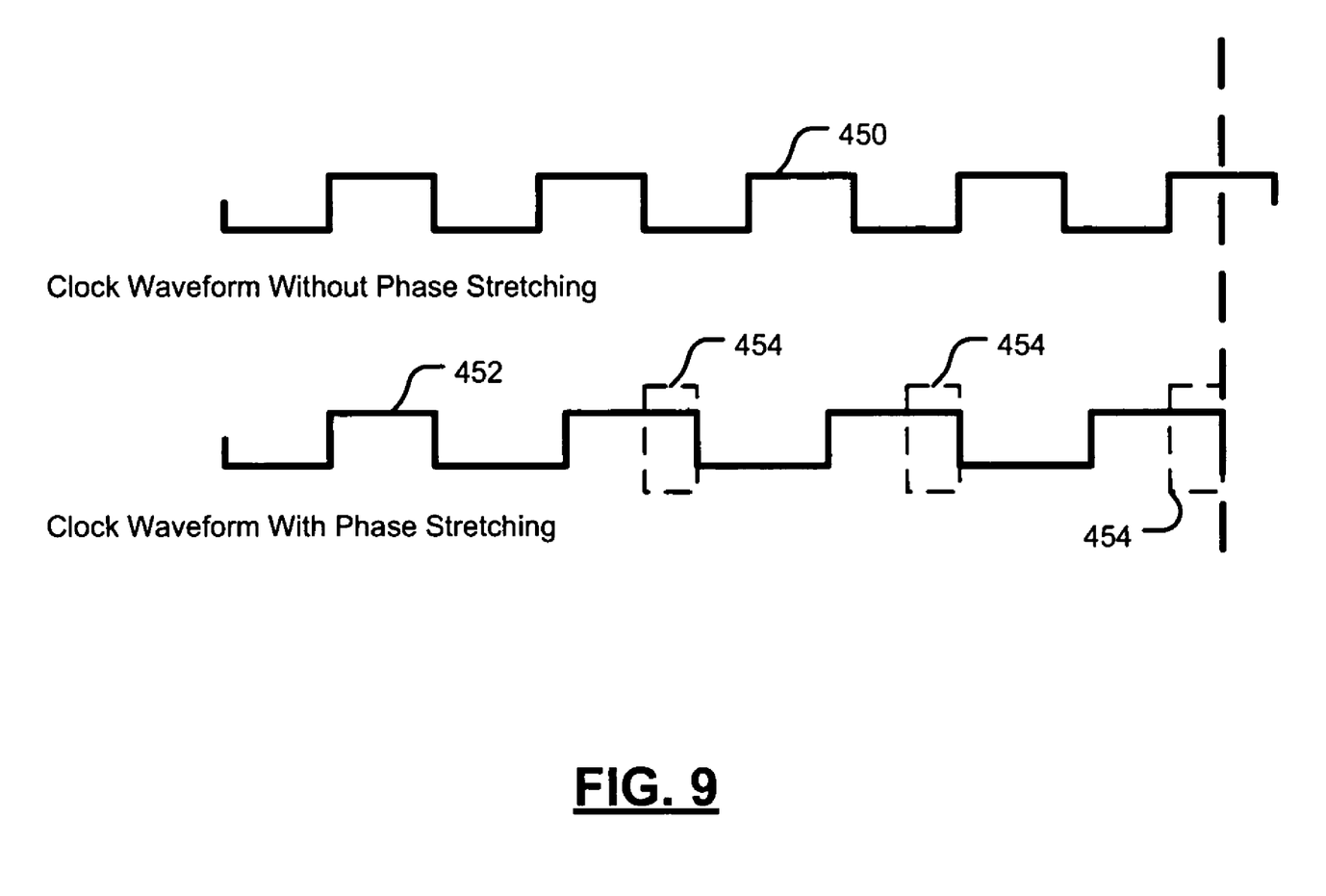
FIG. 9 is a diagram comparison of a clock waveform including phase stretching.

Referring now to FIG. 9, RRO write module phase compensation can be subdivided into two correction types. The first type is a fine adjustment, in which clock phase selection is fine tuned to correct phase latency until the sampling point of a read back pattern falls into an optimum (locked) location. The second type is a coarse adjustment in which cycle latency and DiBit latency are corrected to move the sync-mark pattern to a desired location.

For the fine adjustment, to add or subtract phase offset in the clock system, the phase adjust module 191 slowly adds (stretches) or subtracts (compresses) part of phase offset into the clock interpolator phase until it reaches a required offset angle. A clock waveform 450 is illustrated without adding a stretching phase offset and another waveform 452 is illustrated including stretching 454.

Coarse adjustment includes adding or subtracting the current number of cycle and DiBit settings by a measured cycle and DiBit latency of an RRO write circuit to match with the new number. Normally, sample latency will be increased by one if a clock phase is moved forward. So, in this case, the sample delay number for programming to the RRO write module may be decreased by one sample.

Figure 10A:
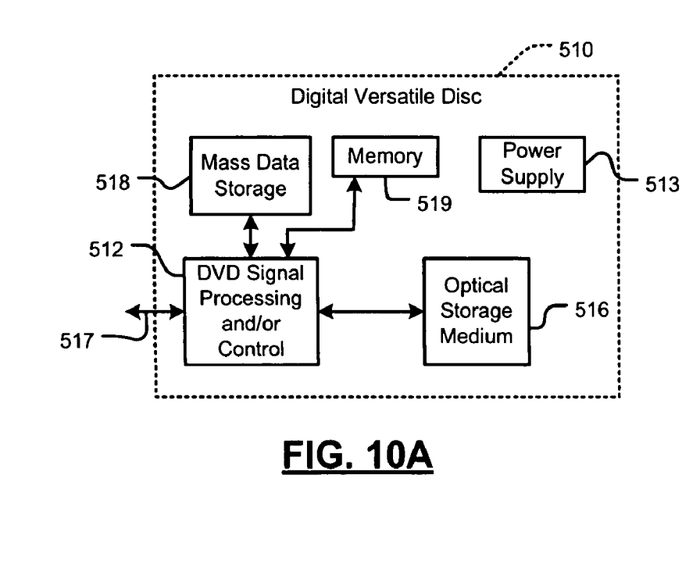
FIG. 10A is a functional block diagram of a digital versatile disk (DVD)

Referring now to FIGS. 10A-10F, various exemplary implementations of the RRO phase shift method are shown. Referring now to FIG. 10A, the RRO phase shift method can be implemented in a digital versatile disc (DVD) drive 510. The method may implement and/or be implemented with either or both signal processing and/or control circuits, which are generally identified in FIG. 10A at 512, mass data storage of the DVD drive 510 and/or a power supply 513. The signal processing and/or control circuit 512 and/or other circuits (not shown) in the DVD drive 510 may process data, perform coding and/or encryption, perform calculations, and/or format data that is read from and/or data written to an optical storage medium 516. In some implementations, the signal processing and/or control circuit 512 and/or other circuits (not shown) in the DVD drive 510 can also perform other functions such as encoding and/or decoding and/or any other signal processing functions associated with a DVD drive.

The DVD drive 510 may communicate with an output device (not shown) such as a computer, television or other device via one or more wired or wireless communication links 517. The DVD drive 510 may communicate with mass data storage 518 that stores data in a nonvolatile manner. The mass data storage 518 may include a hard disk drive (HDD). The HDD may have the configuration shown in FIG. 4. The HDD may be a mini HDD that includes one or more platters having a diameter that is smaller than approximately 1.8". The DVD drive 510 may be connected to memory 519 such as RAM, ROM, low latency nonvolatile memory such as flash memory and/or other suitable electronic data storage.

Figure 10B:
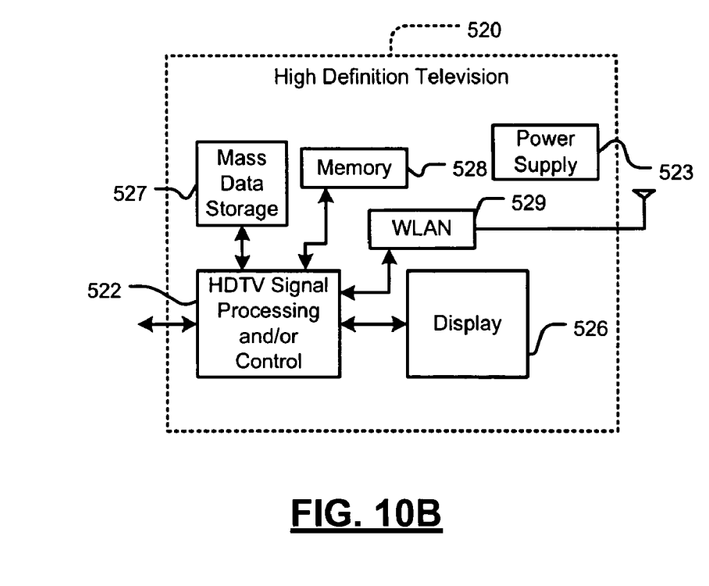
FIG. 10B is a functional block diagram of a high definition television.

Referring now to FIG. 10B, the RRO phase shift method can be implemented in a high definition television (HDTV) 520. The method may implement and/or be implemented in a mass data storage 527 of the HDTV 520. The mass data storage 527 communicates with signal processing and/or control circuits, which are generally identified in FIG. 10B at 522, a WLAN interface, and/or a power supply 523. The HDTV 520 receives HDTV input signals in either a wired or wireless format and generates HDTV output signals for a display 526. In some implementations, signal processing circuit and/or control circuit 522 and/or other circuits (not shown) of the HDTV 520 may process data, perform coding and/or encryption, perform calculations, format data and/or perform any other type of HDTV processing that may be required.

The mass data storage 527 stores data in a nonvolatile manner such as optical and/or magnetic storage devices. At least one HDD may have the configuration shown in FIG. 4 and/or at least one DVD drive may have the configuration shown in FIG. 10A. The HDD may be a mini HDD that includes one or more platters having a diameter that is smaller than approximately 1.8". The HDTV 520 may be connected to memory 528 such as RAM, ROM, low latency nonvolatile memory such as flash memory and/or other suitable electronic data storage. The HDTV 520 also may support connections with a WLAN via a WLAN network interface 529.

Figure 10C:
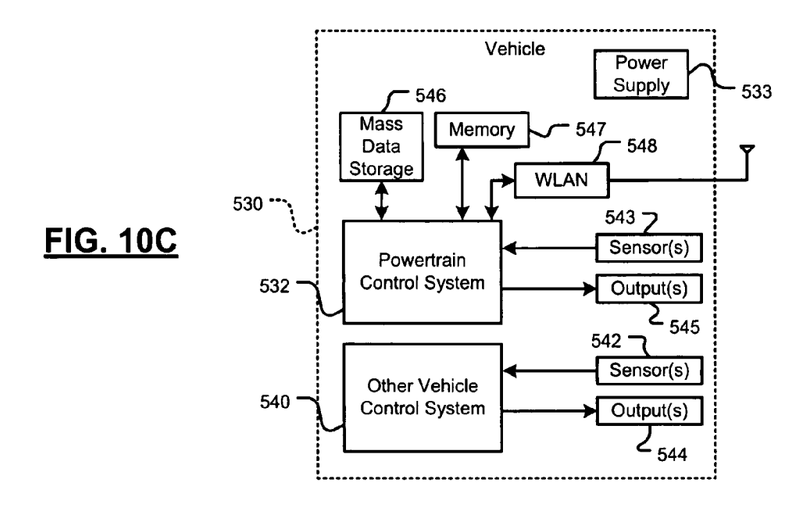
FIG. 10C is a functional block diagram of a vehicle control system.

Referring now to FIG. 10C, the RRO phase shift method may implement and/or be implemented in a mass data storage 546 of a control system of a vehicle 530 communicating with a WLAN interface, and/or a power supply 533.

The mass data storage 546 may also communicate with other control systems 540 of the vehicle 530. The control system 540 may receive signals from input sensors 542 and/or output control signals to one or more output devices 544. In some implementations, the control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

A powertrain control system 532 may communicate with the mass data storage 546 that stores data in a nonvolatile manner. The powertrain control system 532 may receive signals from input sensors 543 and/or output control signals to one or more output devices 545. The mass data storage 546 may include optical and/or magnetic storage devices for example hard disk drives (HDDs) and/or DVD drives. At least one HDD may have the configuration shown in FIG. 4 and/or at least one DVD drive may have the configuration shown in FIG. 10A. The HDD may be a mini HDD that includes one or more platters having a diameter that is smaller than approximately 1.8". The powertrain control system 532 may be connected to memory 547 such as RAM, ROM, low latency nonvolatile memory such as flash memory and/or other suitable electronic data storage. The powertrain control system 532 also may support connections with a WLAN via a WLAN network interface 548. The control system 540 may also include mass data storage, memory and/or a WLAN interface (all not shown).

Figure 10D:
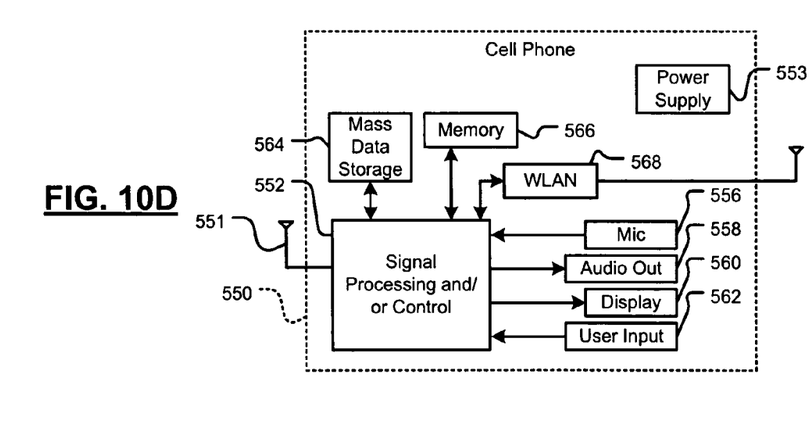
FIG. 10D is a functional block diagram of a cellular phone.

Referring now to FIG. 10D, the RRO phase shift method can be implemented in a mass data storage 564 of a cellular phone 550 that may include a cellular antenna 551. The mass data storage 564 may communicate with either or both signal processing and/or control circuits, which are generally identified in FIG. 10D at 552, a WLAN interface, and/or a power supply 553. In some implementations, the cellular phone 550 includes a microphone 556, an audio output 558 such as a speaker and/or audio output jack, a display 560 and/or an input device 562 such as a keypad, pointing device, voice actuation and/or other input device. The signal processing and/or control circuits 552 and/or other circuits (not shown) in the cellular phone 550 may process data, perform coding and/or encryption, perform calculations, format data and/or perform other cellular phone functions.

The mass data storage 564 stores data in a nonvolatile manner, such as optical and/or magnetic storage devices, for example hard disk drives (HDDs) and/or DVD drives. At least one HDD may have the configuration shown in FIG. 4 and/or at least one DVD drive may have the configuration shown in FIG. 10A. The HDD may be a mini HDD that includes one or more platters having a diameter that is smaller than approximately 1.8". The cellular phone 550 may be connected to memory 566 such as RAM, ROM, low latency nonvolatile memory such as flash memory and/or other suitable electronic data storage. The cellular phone 550 also may support connections with a WLAN via a WLAN network interface 568.

Figure 10E:
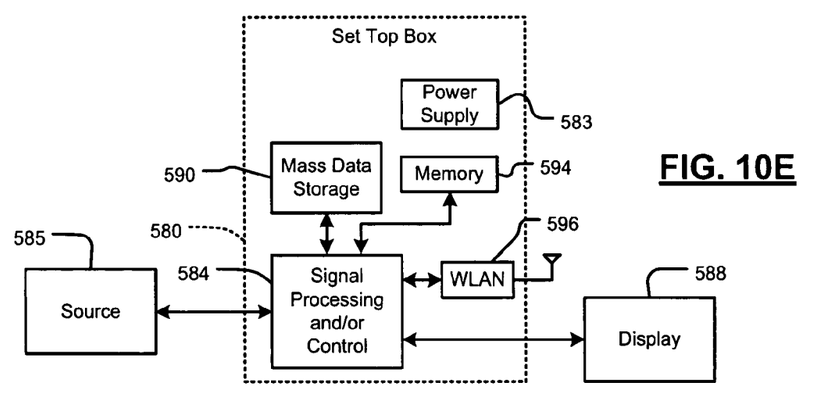
FIG. 10E is a functional block diagram of a set top box.

Referring now to FIG. 10E, the RRO phase shift method can be implemented in a mass data storage 590 of a set top box 580. The mass data storage 590 communicates with either or both signal processing and/or control circuits, which are generally identified in FIG. 10E at 584, a WLAN interface, and/or a power supply 583. The set top box 580 receives signals from a source 585, such as a broadband source, and outputs standard and/or high definition audio/video signals suitable for a display 588, such as a television and/or monitor and/or other video and/or audio output devices. The signal processing and/or control circuits 584 and/or other circuits (not shown) of the set top box 580 may process data, perform coding and/or encryption, perform calculations, format data and/or perform any other set top box function.

The mass data storage 590 stores data in a nonvolatile manner. The mass data storage 590 may include optical and/or magnetic storage devices, for example hard disk drives (HDDs) and/or DVD drives. At least one HDD may have the configuration shown in FIG. 4 and/or at least one DVD drive may have the configuration shown in FIG. 1A. The HDD may be a mini HDD that includes one or more platters having a diameter that is smaller than approximately 1.8". The set top box 580 may be connected to memory 594 such as RAM, ROM, low latency nonvolatile memory such as flash memory and/or other suitable electronic data storage. The set top box 580 also may support connections with a WLAN via a WLAN network interface 596.

Figure 10F:
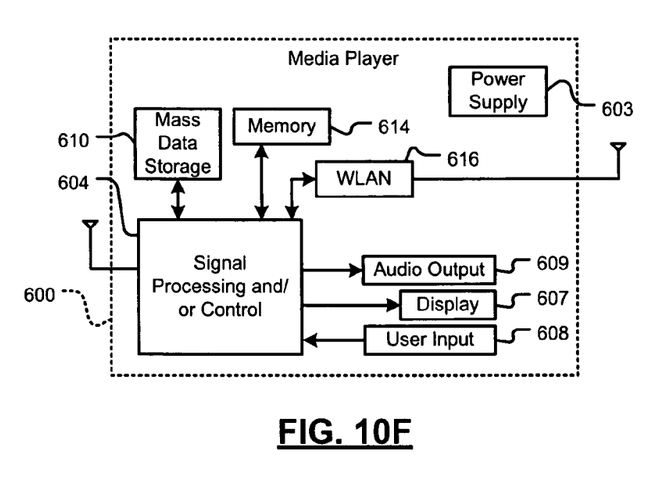
FIG. 10F is a functional block diagram of a media player.

Referring now to FIG. 10F, the RRO phase shift method may be implemented in a mass data storage 610 of a media player 600. The mass data storage 610 may communicate with either or both signal processing and/or control circuits, which are generally identified in FIG. 10F at 604, a WLAN interface, and/or a power supply 603. In some implementations, the media player 600 includes a display 607 and/or a user input 608 such as a keypad, touchpad and the like. In some implementations, the media player 600 may employ a graphical user interface (GUI) that typically employs menus, drop down menus, icons and/or a point-and-click interface via the display 607 and/or user input 608. The media player 600 further includes an audio output 609 such as a speaker and/or audio output jack. The signal processing and/or control circuits 604 and/or other circuits (not shown) of the media player 600 may process data, perform coding and/or encryption, perform calculations, format data and/or perform any other media player function.

The mass data storage 610 stores data, such as compressed audio and/or video content, in a nonvolatile manner. In some implementations, the compressed audio files include files that are compliant with MP3 format or other suitable compressed audio and/or video formats. The mass data storage may include optical and/or magnetic storage devices for example hard disk drives (HDDs) and/or DVD drives. At least one HDD may have the configuration shown in FIG. 4 and/or at least one DVD drive may have the configuration shown in FIG. 10A. The HDD may be a mini HDD that includes one or more platters having a diameter that is smaller than approximately 1.8". The media player 600 may be connected to memory 614 such as RAM, ROM, low latency nonvolatile memory such as flash memory and/or other suitable electronic data storage. The media player 600 also may support connections with a WLAN via a WLAN network interface 616. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A hard disk drive system comprising:
control means for generating a phase offset signal for a repeatable run out (RRO) field of a servo wedge based on an RRO phase of said RRO field and a data phase of data in at least one other servo wedge field of a previously written servo wedge; and
read/write channel means for adjusting a clock phase of said RRO field based on said phase offset signal.

2. The hard disk drive system of claim 1 wherein said read/write channel means further comprises clock means for clocking servo data.

3. The hard disk drive system of claim 2 wherein said read/write channel means further comprises phase adjust means for generating a phase adjust signal based on said phase offset signal.

4. The hard disk drive system of claim 3 wherein said clock means generates a clock phase adjust signal to adjust said clock phase based on said phase adjust signal.

5. The hard disk drive system of claim 3 wherein said phase adjust signal incrementally adds phase offset adjustment to said clock means to increase a clock waveform until a total phase offset of said phase offset signal is reached.

6. The hard disk drive system of claim 1 wherein said at least one other servo wedge field comprises at least one of a preamble, a servo sync mark, a track/sector ID, and a position error signal.

7. The hard disk drive system of claim 1 wherein said at least one other servo wedge field comprises a preamble, wherein said control means generates said phase offset signal by writing a control servo wedge, locking said control servo wedge to a clock phase, and detecting phase and data of said preamble in said control servo wedge.

8. The hard disk drive system of claim 7 wherein said control means generates said phase offset signal by generating a calibration wedge comprising said RRO phase and data in said preamble.

9. The hard disk drive system of claim 8 wherein said control means generates said phase offset signal based on said calibration wedge and said control servo wedge.

10. The hard disk drive system of claim 9 further comprising detector means for detecting said calibration wedge and said control servo wedge and that measures an angle and an amplitude of waveforms within said calibration wedge and said control servo wedge.

11. The hard disk drive system of claim 9 wherein said control means generates said phase offset signal based on total phase offset between said calibration wedge and said control servo wedge.

12. The hard disk drive system of claim 11 wherein said RRO field is checked by said control means for offset with said preamble.

13. The hard disk drive system of claim 11 wherein said control means generates waveform data from a Discrete Fourier Transform of said control servo wedge and said calibration wedge and uses said waveform data to generate said total phase offset.

14. The hard disk drive system of claim 13 wherein said control means generates angle information from said waveform data using Coordinate Rotational Digital Computer (CORDIC).

15. The hard disk drive system of claim 13 wherein said control means generates angle information from said waveform data, a demodulation cycle latency and a demodulation phase latency, and a count cycle based on said demodulation cycle and phase latency.

16. The hard disk drive system of claim 1 wherein said control means aligns a dibit in said servo wedge by stretching said RRO phase to match a sync field phase when said dibit is offset.

17. The hard disk drive system of claim 1 wherein said control means generates an expected waveform for said at least one other servo wedge field and generates a detected waveform from said RRO phase and said data, and wherein said control means generates said phase offset signal from a phase difference between said expected waveform and said detected waveform.

18. The hard disk drive system of claim 17 wherein said control means determines said total phase offset from at least one of a dibit latency, a cycle latency, and a clock phase latency.

19. The hard disk drive system of claim 1 wherein said control means generates a calibration wedge comprising an RRO sync mark generated from said RRO phase, wherein said at least one other servo wedge field comprises a preamble of said previously written servo wedge.

20. The hard disk drive system of claim 19 wherein said control means computes a difference between a phase of said preamble in said previously written servo wedge and a phase of said calibration wedge by analyzing common preamble data and generates said phase offset signal from said difference.

21. A computer program stored on a computer readable medium for use by a processor for operating a computer program for operating a hard disk drive, comprising:
generating a phase offset signal for a repeatable run out (RRO) field of a servo wedge based on an RRO phase of said RRO field and a data phase of data in at least one other servo wedge field of a previously written servo wedge; and
adjusting a clock phase of said RRO field based on said phase offset signal.

22. The computer program for operating the hard disk drive of claim 21 further comprising clocking servo data in a read/write channel module.

23. The computer program for operating the hard disk drive of claim 22 further comprising generating a phase adjust signal based on said phase offset signal.

24. The computer program for operating the hard disk drive of claim 23 further comprising generating a clock phase adjust signal for adjusting said clock phase based on said phase adjust signal.

25. The computer program for operating the hard disk drive of claim 23 wherein said phase adjust signal incrementally adding phase offset adjustment to said clock phase for increasing a clock waveform until a total phase offset of said phase offset signal is reached.

26. The computer program for operating the hard disk drive of claim 21 wherein said at least one other servo wedge field comprises at least one of a preamble, a servo sync mark, a track/sector ID, and a position error signal.

27. The computer program for operating the hard disk drive of claim 21 wherein said at least one other servo wedge field comprises a preamble, and further comprising generating said phase offset signal by writing a control servo wedge, locking said control servo wedge to a clock phase, and detecting phase and data of said preamble in said control servo wedge.

28. The computer program for operating the hard disk drive of claim 27 further comprising generating said phase offset signal by generating a calibration wedge comprising said RRO phase and data in said preamble.

29. The computer program for operating the hard disk drive of claim 28 further comprising generating said phase offset signal based on said calibration wedge and said control servo wedge.

30. The computer program for operating the hard disk drive of claim 29 further comprising detecting said calibration wedge and said control servo wedge and measuring an angle and an amplitude of waveforms within said calibration wedge and said control servo wedge.

31. The computer program for operating the hard disk drive of claim 29 further comprising generating said phase offset signal based on total phase offset between said calibration wedge and said control servo wedge.

32. The computer program for operating the hard disk drive of claim 31 further comprising checking said RRO field offset with said preamble.

33. The computer program for operating the hard disk drive of claim 31 further comprising generating waveform data from a Discrete Fourier Transform of said control servo wedge and said calibration wedge and using said waveform data for generating said total phase offset.

34. The computer program for operating the hard disk drive of claim 33 further comprising generating angle information from said waveform data using Coordinate Rotational Digital Computer (CORDIC).

35. The computer program for operating the hard disk drive of claim 33 further comprising generating angle information from said waveform data, a demodulation cycle latency and a demodulation phase latency, and a count cycle based on said demodulation cycle and phase latency.

36. The computer program for operating the hard disk drive of claim 31 further comprising aligning a dibit in said servo wedge by stretching said RRO phase to match a sync field phase when said dibit is offset.

37. The computer program for operating the hard disk drive of claim 31 further comprising generating an expected waveform for said at least one other servo wedge field and generating a detected waveform from said RRO phase and said data, and further comprising generating said phase offset signal from a phase difference between said expected waveform and said detected waveform.

38. The computer program for operating the hard disk drive of claim 37 further comprising determining said total phase offset from at least one of a dibit latency, a cycle latency, and a clock phase latency.

39. The computer program for operating the hard disk drive of claim 31 further comprising generating a calibration wedge comprising an RRO sync mark generated from said RRO phase, wherein said at least one other servo wedge field comprises a preamble of said previously written servo wedge.

40. The computer program for operating the hard disk drive of claim 39 further comprising computing a difference between a phase of said preamble in said previously written servo wedge and a phase of said calibration wedge by analyzing common preamble data and generates said phase offset signal from said difference.

* * * * *